United States Patent
Liu et al.

(10) Patent No.: US 10,474,848 B2
(45) Date of Patent: Nov. 12, 2019

(54) ELECTRONIC DEVICE AND METHOD FOR ADJUSTING A TOUCH-CONTROL AREA THEREOF

(71) Applicants: LENOVO (BEIJING) CO., LTD., Beijing (CN); BEIJING LENOVO SOFTWARE LTD., Haidian District, Beijing (CN)

(72) Inventors: Junfeng Liu, Beijing (CN); Dong Chen, Beijing (CN); Fanzhi Li, Beijing (CN); Yanxia Chen, Beijing (CN); Xuguo Liu, Beijing (CN); Shiguang Huang, Beijing (CN); Qiming Deng, Beijing (CN); Zezhong Wen, Beijing (CN)

(73) Assignees: LENOVO (BEIJING) CO., LTD., Haidian District, Beijing (CN); BEIJING LENOVO SOFTWARE LTD., Haidian District, Beijing (CN)

( * ) Notice: Subject to any disclaimer, the term of this patent is extended or adjusted under 35 U.S.C. 154(b) by 794 days.

(21) Appl. No.: 13/623,356

(22) Filed: Sep. 20, 2012

(65) Prior Publication Data
US 2013/0074000 A1 Mar. 21, 2013

(30) Foreign Application Priority Data

Sep. 20, 2011 (CN) .......................... 2011 1 0280472
Sep. 30, 2011 (CN) .......................... 2011 1 0300645
Dec. 12, 2011 (CN) .......................... 2011 1 0411513

(51) Int. Cl.
*G06F 21/83* (2013.01)
*G06F 3/0488* (2013.01)
*G06F 21/84* (2013.01)

(52) U.S. Cl.
CPC .......... *G06F 21/83* (2013.01); *G06F 3/04883* (2013.01); *G06F 3/04886* (2013.01); *G06F 21/84* (2013.01); *G06F 2221/2147* (2013.01)

(58) Field of Classification Search
CPC combination set(s) only.
See application file for complete search history.

(56) References Cited

U.S. PATENT DOCUMENTS 7,103,852 B2 * 9/2006 Kairis, Jr. ............. G06F 3/0418
345/173
7,549,127 B2 * 6/2009 Chasen et al. ................ 715/788
(Continued)

FOREIGN PATENT DOCUMENTS

CN 101203821 A 6/2008
CN 101211249 A 7/2008
(Continued)

OTHER PUBLICATIONS

First Office Action dated Dec. 22, 2014 from corresponding Chinese Application No. CN 201110300645.3 (24 pages including English translation).
(Continued)

*Primary Examiner* — Stephen S Hong
*Assistant Examiner* — Hope C Sheffield
(74) *Attorney, Agent, or Firm* — Brinks Gilson & Lione; John C. Freeman

(57) ABSTRACT

The present invention provides an electronic device and a method for adjusting a touch-control area thereof. The touch-control area of a touch-control display unit of the electronic device has a first touch-control area. The method for adjusting a touch-control area includes receiving a touch-control area adjustment command; adjusting the touch-control area of the electronic device to a second touch-control area in response to the touch-control area
(Continued)

adjustment command; and displaying a tag used for representing the second touch-control area; wherein, when an input from the second touch-control area is received, an operation corresponding to the input is executed; when an input from outside of the second touch-control area is received, an operation corresponding to the input is not executed.

23 Claims, 8 Drawing Sheets

(56) References Cited

U.S. PATENT DOCUMENTS

| | | | |
|---|---|---|---|
| 2005/0253817 A1* | 11/2005 | Rytivaara et al. | 345/173 |
| 2006/0087502 A1* | 4/2006 | Karidis et al. | 345/211 |
| 2007/0150842 A1* | 6/2007 | Chaudhri et al. | 715/863 |
| 2008/0059880 A1* | 3/2008 | Cato et al. | 715/700 |
| 2008/0303782 A1 | 12/2008 | Grant et al. | |
| 2009/0322683 A1* | 12/2009 | Tsuji et al. | 345/168 |
| 2010/0020035 A1* | 1/2010 | Ryu et al. | 345/173 |
| 2010/0156795 A1* | 6/2010 | Kim et al. | 345/168 |
| 2011/0090257 A1* | 4/2011 | Ko | G06F 3/0418 345/660 |
| 2012/0011438 A1* | 1/2012 | Kim | G06F 1/1626 715/702 |
| 2012/0046079 A1* | 2/2012 | Kim | H04M 1/72577 455/566 |
| 2012/0075212 A1* | 3/2012 | Park | G06F 3/0488 345/173 |

FOREIGN PATENT DOCUMENTS

| | | |
|---|---|---|
| CN | 101237636 A | 8/2008 |
| CN | 101237637 | 8/2008 |
| CN | 101561743 | 10/2009 |
| CN | 101593502 A | 12/2009 |
| CN | 101625620 A | 1/2010 |
| CN | 102004600 A | 4/2011 |
| WO | WO 2009/032800 A2 | 3/2009 |

OTHER PUBLICATIONS

First Office Action dated Feb. 28, 2015 from corresponding Chinese Application No. CN 201110280472.3 (11 pages including English translation).

Chinese First Office Action with English Translation for related Application No. 201110411513.8 dated Mar. 23, 2015, 10 pages.

Second Office Action dated Oct. 10, 2015 out of corresponding Chinese priority Application No. 201110411513.8 (5 pages including English translation).

Office Action dated Oct. 1, 2015 out of corresponding German priority Patent Application No. 102012108826.8 (7 pages including English translation).

Chinese Second Office Action with English Translation for related Application No. 201110300645.3 dated Jul. 23, 2015 (23 pages including English translation).

Chinese Second Office Action with English Translation for related Application No. 201110280472.3, dated Aug. 4, 2015 (8 pages including English translation).

Third Office Action dated Jan. 12, 2016 out of corresponding Chinese priority Application No. 201110300645.3 (23 pages including English translation).

* cited by examiner

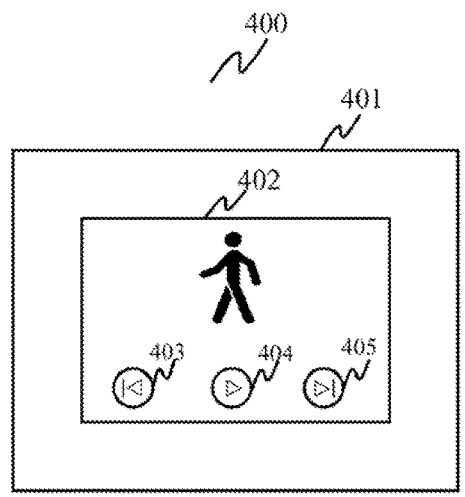
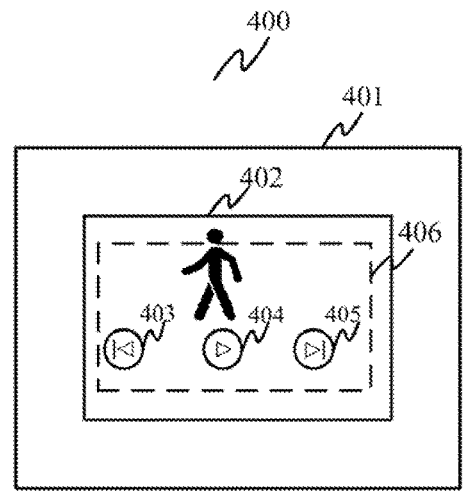
Fig. 4a            Fig. 4b
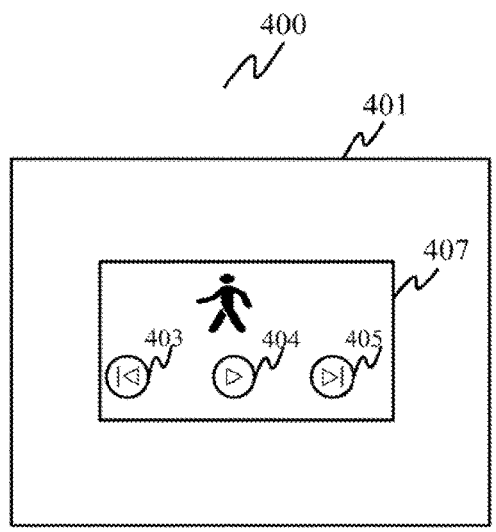
Fig. 4c

US 10,474,848 B2

ELECTRONIC DEVICE AND METHOD FOR ADJUSTING A TOUCH-CONTROL AREA THEREOF

This application claims priority to CN 201110280472.3 filed on Sep. 20, 2011, CN 201110300645.3 filed on Sep. 30, 2011, and CN 201110411513.8 filed on Dec. 12, 2011, the entire contents of each are incorporated herein by reference.

FIELD OF THE INVENTION

The present invention relates to a field of electronic devices, and more particularly, the present invention relates to an electronic device and a method for adjusting a touch-control area thereof.

BACKGROUND OF THE INVENTION

In recent years, an electronic device having a touch sensor is increasingly popular. In such an electronic device, a touch sensor and a display are usually laminated to form a touch-control display screen. Users can issue an input command to the electronic device, by contacting with the surface of the touch-control display screen with an operating body such as a finger. With the user's demand for an increased display region, a touch sensor's area is also increased accordingly, so that the edges of the touch sensor are getting closer to the edges of the electronic device. In this case, when a user's hand is holding the electronic device, due to differences of physical structures such as a finger-size and differences of using habits, a part of users' fingers may come into contact with the touch sensor, causing mishandling.

SUMMARY OF THE INVENTION

In view of the above circumstances, the present invention provides an electronic device and a method for adjusting a touch-control area thereof, which enables users to appropriately adjust a touch-control area of a touch sensor as needed, and effectively reduces mishandling. In addition, the electronic device and the method for adjusting a touch-control area thereof according to an embodiment of the present invention, by displaying a tag used for representing the adjusted touch-control area, make the adjustment results visualized and further improve the user experience.

According to an embodiment of the present invention, there is provided a method for adjusting a touch-control area, applied to an electronic device, the electronic device comprising a touch-control display unit, the touch-control area of the touch-control display unit being a first touch-control area, the method for adjusting a touch-control area comprising: receiving a touch-control area adjustment command; in response to the touch-control area adjustment command, adjusting the touch-control area of the electronic device to a second touch-control area; and displaying a tag used for representing the second touch-control area; wherein, when an input from the second touch-control area is received, an operation corresponding to the input is executed; when an input from outside of the second touch-control area is received, an operation corresponding to the input is not executed.

The touch-control display unit comprises a touch sensor, the first touch-control area corresponding to a first portion in the touch sensor, and said adjusting the touch-control area of the electronic device to a second touch-control area may comprise: in response to the touch-control area adjustment command, determining a second portion in the touch sensor; and shutting off the other portions except the second portion in the touch sensor.

The touch-control display unit comprises a touch sensor, the first touch-control area corresponding to a first portion in the touch sensor, and said adjusting the touch-control area of the electronic device to a second touch-control area may comprise: in response to the touch-control area adjustment command, determining a third portion in the touch sensor; and setting the third portion in the touch sensor to a disabled state, in which disabled state when a touch-control signal from the third portion is received, no response is made to the touch-control signal.

The touch-control display unit may comprise a display unit, and a display image is displayed on a first display region in the display region of the display unit, the method for adjusting a touch-control area may further comprise: in response to the touch-control area adjustment command, displaying the display image on a second display region in the display region of the display unit.

The first display region corresponds to a first portion in the display unit, and said displaying the display image on the second display region may comprise: in response to the touch-control area adjustment command, determining a second portion in the display unit; utilizing the second portion in the display unit to display the display image of the electronic device; and shutting off the other portions except the second portion in the display unit.

The first display region corresponds to a first portion in the display unit, and said displaying the display image on the second display region may comprise: in response to the touch-control area adjustment command, determining a third portion in the display unit; and controlling the third portion in the display unit to display an image unrelated to the display image.

The touch-control display unit comprises a display unit, and a display image is displayed on a first display region in the display region of the display unit, the method for adjusting a touch-control area may further comprise: in response to the touch-control area adjustment command, displaying the display image on a second display region in the display region of the display unit; moreover, the display image comprising an input control which can be operated by a user and contents which can not be operated by a user, the input control being displayed at a first position on the first display region, and the contents being displayed at a second position on the first display region, and said displaying the display image on the second display region may comprise: displaying the input control at a third position within the second touch-control area, and maintaining the content being displayed in the second position.

An input control which can be operated by a user and contents which can not be operated by a user are displayed in the first display region, the input control being displayed at a first position on the first display region, and the contents being displayed at a second position on the first display region, and said displaying the display image on the second display region may comprise: displaying the input control at a third position within the second touch-control area, and displaying the contents at a fourth position within the second touch-control area.

When the touch-control area adjustment command satisfies a predefined condition, switching the touch-control display unit to a touch-control area locked state, and changing a first image displayed on the display region of the touch-control display unit to a second image, the first image having at least a same part as the second image, wherein, in the touch-control area locked state, the electronic device, in response to a touch-control area lock-releasing signal, releases the touch-control area locked state, and in the touch-control area locked state, except for operations used to generate a touch-control area lock-releasing signal, the electronic device ignores touch operations performed on the touch-control area.

When the touch-control area adjustment command satisfies a predefined condition, switching the touch-control display unit to a touch-control area locked state, and at least setting an active region and a locked region in the display region of the touch-control display unit, the active region corresponding to the second touch-control area, the locked region corresponding to an area except the second touch-control area; on the active region, displaying an icon or at least part of a running window of a preset application; in the touch-control area locked state, responding only to touch operations in the active region and operations for unlocking the electronic device.

According to another embodiment of the present invention, there is provided an electronic device, of which a touch-control area of a touch-control display unit being a first touch-control area, the electronic device comprising: a receiver unit, receiving a touch-control area adjustment command; an adjusting unit, in response to the touch-control area adjustment command, adjusting the touch-control area of the electronic device to a second touch-control area; and a first display processing unit, displaying a tag used for representing the second touch-control area; wherein, when an input from the second touch-control area is received, the electronic device executes an operation corresponding to the input; when an input from outside of the second touch-control area is received, the electronic device does not execute an operation corresponding to the input.

The touch-control display unit comprises a touch sensor, the first touch-control area corresponding to a first portion in the touch sensor, and the adjusting unit may comprise: a first determination unit, in response to the touch-control area adjustment command, determining a second portion in the touch sensor; and a first shut-off unit, shutting off the other portions except the second portion in the touch sensor.

The electronic device comprises a touch sensor, the first touch-control area corresponding to a first portion in the touch sensor, and the adjusting unit may comprise: a second determination unit, in response to the touch-control area adjustment command, determining a third portion in the touch sensor; and a setting unit, setting the third portion in the touch sensor to a disabled state, in which disabled state when a touch-control signal from the third portion is received, no response is made to the touch-control signal.

The touch-control display unit comprises a display unit, and a display image is displayed on a first display region in the display region of the display unit, the electronic device further comprising: a second display processing unit, in response to the touch-control area adjustment command, displaying the display image on a second display region in the display region of the display unit.

The first display region corresponds to a first portion in the display unit, and the second display processing unit may comprise: a third determination unit, in response to the touch-control area adjustment command, determining a second portion in the display unit; a first sub-display processing unit, utilizing the second portion in the display unit to display the display image of the electronic device; and a second shut-off unit, shutting off the other portions except the second portion in the display unit.

The first display region corresponds to a first portion in the display unit, and the second display processing unit may comprise: a fourth determination unit, in response to the touch-control area adjustment command, determining a third portion in the display unit; a second sub-display processing unit, controlling the third portion in the display unit to display an image unrelated to the display image.

The electronic device may further comprise a processing unit, which is configured for: when the touch-control area adjustment command satisfies a predefined condition, switching the touch-control display unit to a touch-control area locked state, and changing a first image displayed on the display region of the touch-control display unit to a second image, the first image having at least a same part as the second image, wherein, in the touch-control area locked state, a control unit causes the electronic device, in response to a touch-control area lock-releasing signal, to release the touch-control area locked state, and in the touch-control area locked state, except for operations used to generate a touch-control area lock-releasing signal, the electronic device ignores touch operations performed on the touch-control area.

The electronic device may further comprise a processing unit, which is configured for: when the touch-control area adjustment command satisfies a predefined condition, switching the touch-control display unit to a touch-control area locked state, and at least setting an active region and a locked region in the display region of the touch-control display unit, the active region corresponding to the second touch-control area, the locked region corresponding to an area except the second touch-control area; on the active region, displaying an icon or at least part of a running window of a preset application; in the touch-control area locked state, responding only to touch operations in the active region and operations for unlocking the electronic device.

According to yet another embodiment of the present invention, there is provided an electronic device comprising a touch sensor, a touch-control area thereof being a first touch-control area, the electronic device further comprising: an input interface, configured for receiving a touch-control area adjustment command; a processor, configured for in response to the touch-control area adjustment command, adjusting the touch-control area of the electronic device to a second touch-control area; and a display, configured for displaying a tag used for representing the second touch-control area; wherein, when an input from the second touch-control area is received, the processor is configured to execute an operation corresponding to the input; when an input from outside of the second touch-control area is received, the processor is configured to not execute an operation corresponding to the input.

In the electronic device and the method for adjusting a touch-control area thereof according to an embodiment of the present invention, by—in response to a touch-control area adjustment command—shutting off or disabling at least a portion in a touch sensor, the touch-control area of the electronic device is adjusted, which enables a user to appropriately adjust the touch-control area of the touch sensor as needed, thus makes the setting of the touch-control area more suitable for the user's physical structure and using habits, and can reduce mishandling. Further, in the electronic device and the method for adjusting a touch-control area thereof according to an embodiment of the present invention, by displaying a tag used for representing the adjusted touch-control area, the effect of the touch-control area adjustment can be presented via visualization, and the user experience is further improved.

BRIEF DESCRIPTION OF THE DRAWINGS

FIGS. 4A-4C are schematic views illustrating an application example of the method for adjusting a touch-control area according to an embodiment of the present invention;

DETAILED DESCRIPTION OF THE PREFERRED EMBODIMENTS

Below, embodiments of the present invention will be described in detail with reference to the accompanying drawings.

First, with reference to FIG. 1, a method for adjusting a touch-control area according to an embodiment of the present invention will be described.

The method for adjusting a touch-control area according to this embodiment of the invention is applied in an electronic device. The electronic device is such as a smart phone, a personal digital assistant, a tablet PC, etc. The electronic device comprises a touch sensor. An area provided by the touch sensor for a user to perform touch operations is referred to as a touch-control area. In addition, the touch sensor described herein may be a resistive touch sensor, a capacitive touch sensor or the like. Moreover, the touch sensor comprises not only a contact-type touch sensor, but also may comprise a proximity touch sensor or the like. In addition, the touch sensor may be a single sensor, and also may be, for example, a plurality of sensors arranged in array.

In addition, the electronic device may also comprise a display screen, which hereinafter as appropriate is also referred to as a monitor or a display unit. The area of the display screen and the area of the touch sensor may be identical, also may be different. Optionally, the display screen and the touch sensor are provided laminated, to form a touch-control display screen.

At the beginning of the method for adjusting a touch-control area according to this embodiment of the invention, the touch-control area of the electronic device is a first touch-control area. The first touch-control area, for example, corresponds to a first sensing portion in the touch sensor.

Figure 1:
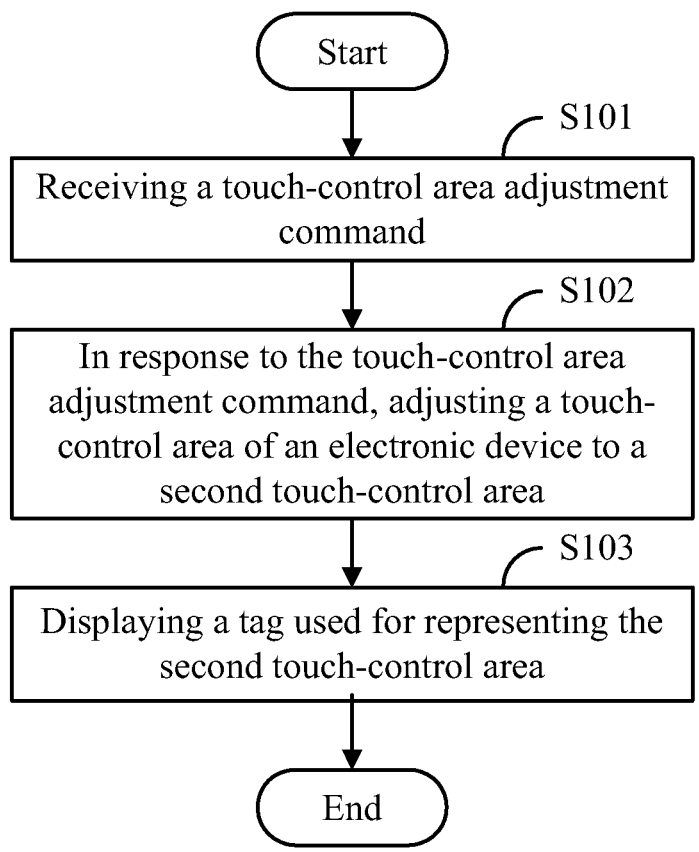
FIG. 1 is a flowchart illustrating a method for adjusting a touch-control area according to an embodiment of the present invention.

As shown in FIG. 1, in step S101, the method for adjusting a touch-control area according to this embodiment of the invention, receives a touch-control area adjustment command. Specifically, the method for adjusting a touch-control area may receive the touch-control area adjustment command in a variety of ways.

More specifically, for example, a hard-key switch may be provided to the electronic device for issuing a touch-control area adjustment command. The method for adjusting a touch-control area—in response to an detection that the hard-key switch is turned on—receives the touch-control area adjustment command.

For another example, through a software, a control (a soft-key switch) may be provided on the touch-control display screen of the electronic device for issuing a touch-control area adjustment command. The method for adjusting a touch-control area—in response to an detection that the control is operated by a user—receives the touch-control area adjustment command.

In addition, a specific gesture mode may be preset for issuing a touch-control area adjustment command. The method for adjusting a touch-control area may—in response to an detection that the specific gesture is performed by a user—receive the touch-control area adjustment command. The skilled in the art may set any suitable gesture mode as the specific gesture mode as needed, which is not particularly limited herein.

In addition, the touch-control area adjustment command received by the method for adjusting a touch-control area may specify the size of the adjusted touch-control area. More specifically, the touch-control area adjustment command may be a step-type adjustment command, such as an adjustment command corresponding to a large touch-control area, an intermediate touch-control area and a small touch-control area. For example, the method for adjusting a touch-control may preset a plurality of hard-key or soft-key switches corresponding to touch-control area adjustment commands for various size levels as described above, or different steps in a single hard-key or soft-key switch. Thereafter, the method for adjusting a touch-control area may—in response to the detection of a respective switch is turned on or a respective step is selected—receives a respective touch-control area adjustment command for a corresponding size.

Optionally, the touch-control area adjustment command received by the method for adjusting a touch-control area may also be a continuous adjustment command. For example, the method for adjusting a touch-control area may—in response to a detection of any closed pattern drawn by a user for the touch sensor—receive a touch-control area adjustment command corresponding to that pattern.

In step S102, the method for adjusting a touch-control area—in response to the touch-control area adjustment command—adjust the touch-control area of the electronic device to a second touch-control area.

Specifically, in one embodiment, the method for adjusting a touch-control area may—in response to the touch-control area adjustment command—determine a second portion in the touch sensor. More specifically, the method for adjusting a touch-control area—based on the size of the adjusted touch-control area specified in the touch-control area adjustment command—determines a corresponding scope of the touch sensor to that size of the touch-control area, i.e., determines a second portion in the touch sensor. That is, the second sensing portion in the touch sensor corresponds to the second touch-control area.

Thereafter, the method for adjusting a touch-control area shuts off the other portions except the second portion in the touch sensor. At this time, when a user contact with the other portions in the touch sensor, all the other portions in the touch sensor in will not respond to the user's touch.

In other words, in this case, the method for adjusting a touch-control area—when receiving an input from the second touch-control area—executes an operation corresponding to the input. On the other hand, the method for adjusting a touch-control area—when receiving an input from outside of the second touch-control area—does not execute an operation corresponding to the input.

In another embodiment, the method for adjusting a touch-control area may—in response to the touch-control area adjustment command—determine a third portion in the touch sensor. More specifically, the method for adjusting a touch-control area—based on the size of the adjusted touch-control area specified in the touch-control area adjustment command—determines a corresponding scope of the touch sensor to that size of the touch-control area, and determines the portion except the above-described scope in the touch sensor as the third portion. That is, the third portion corresponds to the area in the touch-control area of the touch sensor except the second touch-control area.

Thereafter, the method for adjusting a touch-control area sets the third portion in the touch sensor to a disabled state, in which disabled state when a user contacts with the third part of the touch sensor, although the third portion of the touch sensor generates a touch-control signal in response to the user's contact, the method for adjusting a touch-control area makes no response to the touch-control signal. For example, the method for adjusting a touch-control area may shield the touch signal.

In other words, in this case, the method for adjusting a touch-control area—when receiving an input from the second touch-control area—executes an operation corresponding to the input. On the other hand, the method for adjusting a touch-control area—when receiving an input from outside of the second touch-control area—does not execute an operation corresponding to the input.

Next, in step S103, the method for adjusting a touch-control area displays a tag used for representing the second touch-control area. For example, the method for adjusting a touch-control area may display a line frame corresponding to the second touch-control area, as the tag. For another example, the method for adjusting a touch-control area may display what is displayed in the second touch-control area with a special display effect (such as a different color, brightness, etc.), as the tag. Of course, the skilled in the art may set the tag used for representing the second touch-control area at will as needed, which is not particularly limited herein.

The above has described the method for adjusting a touch-control area according to an embodiment of the invention. By—in response to a touch-control area adjustment command—shutting off or disabling at least a portion in a touch sensor, the touch-control area of the electronic device is adjusted, which enables a user to appropriately adjust the touch-control area of the touch sensor as needed, thus makes the setting of the touch-control area more suitable for the user's physical structure and using habits, and can reduce mishandling. Further, in the method for adjusting a touch-control area according to an embodiment of the invention, by displaying a tag used for representing the adjusted touch-control area, the effect of the touch-control area adjustment can be presented via visualization, and the user experience is further improved.

It should be noted that, after the touch-control area is adjusted by the processing of the steps S101-S103 described above, the method for adjusting a touch-control area may continue to display the tag displayed in step S103 for representing the second touch-control area on the electronic device, so that the user can be visually informed of the scope of the current touch-control area. Alternatively, the method for adjusting a touch-control area may also make the tag no longer displayed on the electronic device after a predefined time interval, so that the user is able to view the display image on the electronic device more clearly.

In addition, it should be noted that, the method for adjusting a touch-control area according to an embodiment of the invention, not only can adjust the touch-control area, but also can further adjust the display region.

More specifically, as described above, the touch-control display unit comprises a display unit. The display unit may be an LED display unit, a liquid crystal display unit, etc. The display unit has a display region. Further, at the beginning of the method for adjusting a display region according to this embodiment of the invention, a display image is displayed on a first display region in the display region of the display unit. The first display region corresponds to a first portion in the display unit.

At this time, the method for adjusting a touch-control area can, in response to the touch-control area adjustment command, displays the display image on a second display region in the display region of the display unit.

Specifically, in one embodiment, the method for adjusting a touch-control area may—in response to the touch-control area adjustment command—determine a second portion in the display unit, in an operation similar to the operation in step S102 described above. Next, the method for adjusting a touch-control area utilizes the second portion in the display unit to display the display image of the electronic device, and shuts off the other portions except the second portion in the display unit.

Thus, the method for adjusting a touch-control area displays the display image on the second display region.

In another embodiment, the method for adjusting a touch-control area may—in response to the touch-control area adjustment command—determine a third portion in the display unit, in an operation similar to the operation in step S102 described above, and control the third portion in the display unit to display an image unrelated to the display image. For example, the method for adjusting a touch-control area may make the third portion present the same color as the color of the border of the electronic device, so that the third section presents like a border from a user's perspective.

It should be noted that, in the above described embodiment, the method for adjusting a touch-control area adjust the display region based on the touch-control area adjustment command. Alternatively, the method for adjusting a touch-control area may also adjust the display region based on a separate display region adjustment command. In other words, the method for adjusting a touch-control area according to an embodiment of the invention, may—in response to the separated touch-control area adjustment command and display region adjustment command—adjust the touch-control area and the display region respectively, also may—in response to a single command—adjust the touch-control area and the display region simultaneously.

In addition, it should be noted that, in the above described embodiment, the method for adjusting a touch-control area—based on the touch-control area adjustment command—integrally adjust the display image to be displayed in the second display region. Alternatively, the method for adjusting a touch-control area also may—based on the touch-control area adjustment command—make different adjustments according to different information in the display image.

Below, with reference to FIGS. 4A-4C, description will be given in combination with a specific example.

FIGS. 4A-4C are schematic views illustrating an application example of the method for adjusting a touch-control area according to an embodiment of the present invention. In FIG. 4A, 401 denotes an edge of the electronic device 400, and 402 denotes a first touch-control area (of the touch sensor) of the electronic device, which meanwhile is also a first display region (of the display unit) of the electronic device. That is, in FIG. 4A, the current touch-control area of the electronic device is identical with the display region. In addition, in the first display region 402, there are displayed input controls 403-405 which can be operated by a user, and video contents which can not be operated by the user.

In one embodiment, the method for adjusting a touch-control area can—based on composition information of the display image—identify that the display image comprises two images of different properties: input controls which can be operated by a user, and contents which can not be operated by the user. Thus, the method for adjusting a touch-control area—when receiving a touch-control area adjustment command—adjusts the input controls and the contents, respectively.

Specifically, it is assumed that the input controls in FIG. 4A is displayed at a first position on the first display region 402, whereas the content in FIG. 4A is displayed at a second position on the first display region 402. At this time, on the one hand, the method for adjusting a touch-control area—in response to a touch-control area adjustment command—adjusts the touch-control area of the electronic device to a second touch-control area 406 shown as a broken line in FIG. 4B. On the other hand, the method for adjusting a touch-control area—in response to the touch-control area adjustment command and based on the identifying results described above—displays the input controls which can be operated by a user at a third position located within the second touch-control area 406, such as the locations of 403-405 shown in FIG. 4B, and maintains the contents which can not be operated by the user being displaying at the second position. The display of the adjusted electronic device 400 is shown as FIG. 4B.

Seen by comparing FIG. 4A and FIG. 4B that, in this case, the method for adjusting a touch-control area only adjusts the positions of the input controls 403-405 to be within the second touch-control area 406, thus facilitating a user's operation. At the same time, the method for adjusting a touch-control area maintains the video contents to be continuously presented in a larger size, and thus facilitates a user's viewing.

In another embodiment, the method for adjusting a touch-control area does not perform the above-described identification operations to the display image, but adjust the whole display of the display image. At this time, on the one hand, the method for adjusting a touch-control area—in response to a touch-control area adjustment command—adjusts the touch-control area of the electronic device to be a second touch-control area 407 as shown in FIG. 4C. On the other hand, the method for adjusting a touch-control area—in response to the touch-control area adjustment command—displays the input controls at a third position located within the second touch-control area 407, and displays the content at a fourth position within the second touch-control area 407. The display of the adjusted electronic device 400 is shown as FIG. 4C.

Seen by comparing FIG. 4A and FIG. 4C that, in this case, the method for adjusting a touch-control area adjusts the whole display of the display image, thus maintains the consistency of the layout of each element (such as the input controls 403-405 which can be operated by a user, and the video contents which can not be operated by the user) in the display image before and after adjustment.

The above has described the method for adjusting a touch-control area according to an embodiment of the present invention. Below, with reference to FIG. 2 and FIG. 3, an electronic device according to an embodiment of the present invention will be described.

The electronic device according to an embodiment of the present invention is, for example, a smart phone, a personal digital assistant, a tablet PC, etc. The electronic device comprises a touch sensor. An area provided by the touch sensor for a user to perform touch operations is referred to as a touch-control area. In addition, the touch sensor described herein may be a resistive touch sensor, a capacitive touch sensor or the like. Moreover, the touch sensor comprises not only a contact-type touch sensor, but also may comprise a proximity touch sensor or the like. In addition, the touch sensor may be a single sensor, and also may be, for example, a plurality of sensors arranged in array.

In addition, the electronic device may also comprise a display screen, which hereinafter as appropriate is also referred to as a monitor or a display unit. The area of the display screen and the area of the touch sensor may be identical, also may be different. Optionally, the display screen and the touch sensor are provided laminated, to form a touch display screen.

A current touch-control area of the electronic device is a first touch-control area. The first touch-control area, for example, corresponds to a first sensing portion in the touch sensor.

Figure 2:
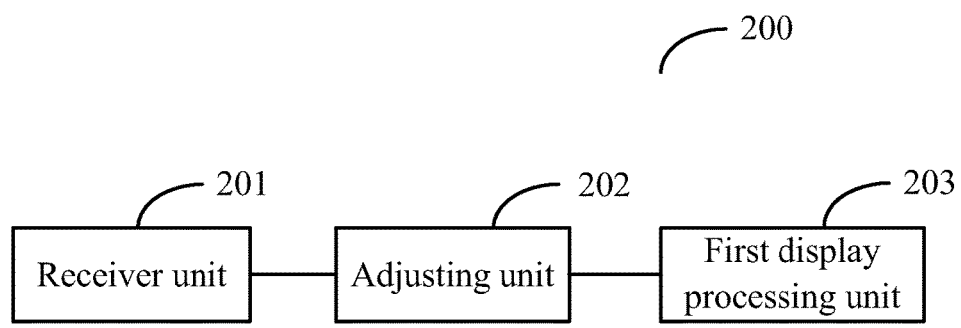
FIG. 2 is a block diagram illustrating a main configuration of an electronic device according to an embodiment of the present invention.

As shown in FIG. 2, the electronic device 200 according to this embodiment of the invention comprises a receiver unit 201, an adjusting unit 202 and a first display processing unit 203.

The receiver unit 201 receives a touch-control area adjustment command. Specifically, the receiver unit 201 may receive the touch-control area adjustment command in a variety of ways.

More specifically, for example, a hard-key switch may be provided to the electronic device for issuing a touch-control area adjustment command. The receiver unit 201—in response to a detection that the hard-key switch is turned on—receives the touch-control area adjustment command.

For another example, through software, a control (a soft-key switch) may be provided on the touch-control display screen of the electronic device for issuing a touch-control area adjustment command. The receiver unit 201—in response to detection that the control is operated by a user—receives the touch-control area adjustment command.

In addition, a specific gesture mode may be preset for issuing a touch-control area adjustment command. The receiver unit 201 may—in response to detection that the specific gesture is performed by a user—receive the touch-control area adjustment command. The skilled in the art may set any suitable gesture mode as the specific gesture mode as needed, which is not particularly limited herein.

In addition, the touch-control area adjustment command received by the receiver unit 201 may specify the size of the adjusted touch-control area. More specifically, the touch-control area adjustment command may be a step-type adjustment command, such as an adjustment command corresponding to a large touch-control area, an intermediate touch-control area and a small touch-control area. For example, the electronic device may preset a plurality of hard-key or soft-key switches corresponding to touch-control area adjustment commands for various size levels as described above, or different steps in a single hard-key or soft-key switch. Thereafter, the receiver unit 201 may—in response to the detection of a respective switch is turned on or a respective step is selected—receive a respective touch-control area adjustment command for a corresponding size.

Optionally, the touch-control area adjustment command received by the receiver unit 201 may also be a continuous adjustment command. For example, the receiver unit 201 may—in response to a detection of any closed pattern drawn by a user for the touch sensor—receive a touch-control area adjustment command corresponding to that pattern.

The adjusting unit 202—in response to the touch-control area adjustment command—adjusts the touch-control area of the electronic device to a second touch-control area.

Specifically, in one embodiment, the adjusting unit 202 may comprise a first determination unit and a first shut-off unit. The first determination unit—in response to the touch-control area adjustment command—determines a second portion in the touch sensor. More specifically, the first determination unit—based on the size of the adjusted touch-control area specified in the touch-control area adjustment command—determines a corresponding scope of the touch sensor to that size of the touch-control area, i.e., determines a second portion in the touch sensor. That is, the second sensing portion in the touch sensor corresponds to the second touch-control area. The first shut-off unit shuts off the other portions except the second portion in the touch sensor. At this time, when a user contact with the other portions in the touch sensor, all the other portions in the touch sensor in will not respond to the user's touch.

In other words, in this case, the electronic device 200—when receiving an input from the second touch-control area—executes an operation corresponding to the input. On the other hand, the electronic device 200—when receiving an input from outside of the second touch-control area—does not execute an operation corresponding to the input.

In another embodiment, the adjustment unit 202 may comprise a second determination unit and a setting unit. The second determination unit, in response to the touch-control area adjustment command, determines a third portion in the touch sensor. More specifically, the second determination unit—based on the size of the adjusted touch-control area specified in the touch-control area adjustment command—determines a corresponding scope of the touch sensor to that size of the touch-control area, and determines the portion except the above-described scope in the touch sensor as the third portion. That is, the third portion corresponds to the area in the touch-control area of the touch sensor except the second touch-control area.

The setting unit sets the third portion in the touch sensor to a disabled state, in which disabled state when a touch-control signal from the third portion is received, no response is made to the touch-control signal. That is, in the disabling state, when a user contacts with the third part of the touch sensor, although the third portion of the touch sensor generates a touch-control signal in response to the user's contact, the electronic device 200 makes no response to the touch-control signal. For example, the electronic device 200 may shield the touch signal.

In other words, in this case, the electronic device 200—when receiving an input from the second touch-control area—executes an operation corresponding to the input. On the other hand, the electronic device 200—when receiving an input from outside of the second touch-control area—does not execute an operation corresponding to the input.

The first display processing unit 203 displays a tag used for representing the second touch-control area. For example, the first display processing unit 203 may display a line frame corresponding to the second touch-control area, as the tag. For another example, the first display processing unit 203 may display what is displayed in the second touch-control area with a special display effect (such as a different color, brightness, etc.), as the tag. Of course, the skilled in the art may set the tag used for representing the second touch-control area at will as needed, which is not particularly limited herein.

It should be noted that, the electronic device according to an embodiment of the invention, not only can adjust the touch-control area, but also can further adjust the display region.

At this time, the electronic device further comprises: a second display processing unit, in response to the touch-control area adjustment command, displaying the display image on a second display region in the display region of the display unit.

Specifically, in one embodiment, the second display processing unit may comprise: a third determination unit, in response to the touch-control area adjustment command, determining a second portion in the display unit; a first sub-display processing unit, utilizing the second portion in the display unit to display the display image of the electronic device; and a second shut-off unit, shutting off the other portions except the second portion in the display unit. Thus, the method for adjusting a touch-control area displays the display image on the second display region.

In another embodiment, the second display processing unit may comprise: a fourth determination unit, in response to the touch-control area adjustment command, determining a third portion in the display unit; and a second sub-display processing unit, controlling the third portion in the display unit to display an image unrelated to the display image. For example, the second sub-display processing unit may make the third portion present the same color as the color of the border of the electronic device, so that the third section presents like a border from a user's perspective.

Figure 3:
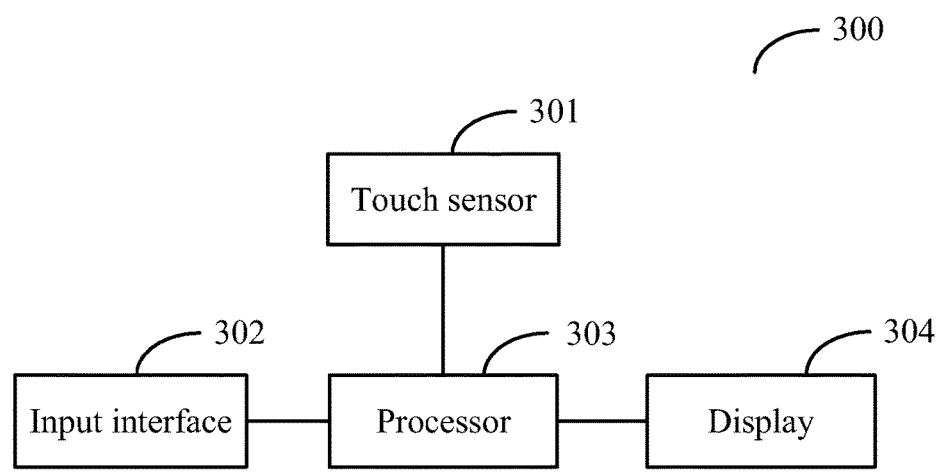
FIG. 3 is a block diagram illustrating a main configuration of an electronic device according to another embodiment of the present invention.

Below, with reference to FIG. 3, a main configuration of an electronic device according to another embodiment of the present invention will be described. As shown in FIG. 3, the electronic device 300 comprises a touch sensor 301, of which the touch-control area is a first touch-control area, the electronic device 300 further comprising:

an input interface 302, configured for receiving a touch-control area adjustment command;

a processor 303, configured for—in response to the touch-control area adjustment command—adjusting the touch-control area of the electronic device to a second touch-control area; and a display 304, configured for displaying a tag used for representing the second touch-control area;

wherein, when an input from the second touch-control area is received, the processor is configured to execute an operation corresponding to the input; when an input from outside of the second touch-control area is received, the processor is configured to not execute an operation corresponding to the input.

The configurations and operations of each unit of the electronic device 300 have been given in the detailed description of the method for adjusting a touch-control area, with reference to FIG. 1, which is no more repeated here.

The above has described the electronic device according to an embodiment of the invention. By—in response to a touch-control area adjustment command—shutting off or disabling at least a portion in a touch sensor, the touch-control area of the electronic device is adjusted, which enables a user to appropriately adjust the touch-control area of the touch sensor as needed, thus makes the setting of the touch-control area more suitable for the user's physical structure and using habits, and can reduce mishandling. Further, in the electronic device according to an embodiment of the invention, by displaying a tag used for representing the adjusted touch-control area, the effect of the touch-control area adjustment can be presented via visualization, and the user experience is further improved.

The above has described, with reference to FIGS. 1 to 4, an electronic device and a method for adjusting a touch-control area thereof according to an embodiment of the present invention.

Next, with reference to FIGS. 5 to 8, an electronic device and a method for locking a touch screen thereof according to another embodiment of the present invention will be described.

For example, in a preferred embodiment of the present invention, when the touch screen displays a first image, a user of the electronic device 500 input a touch-control area adjustment command by operating the touch screen. The processing unit 502 receives the touch-control area adjustment command, and determines whether or not the touch-control area adjustment command satisfies a predefined condition. When the touch-control area adjustment command satisfies a predefined condition, the electronic device 500 is switched to a touch screen locked state, and the touch screen displays a second image, the first image having at least a same part as the second image. In the touch screen locked state, except for operations used to generate a touch screen lock-releasing signal, the electronic device 500 ignores touch operations performed on the touch screen.

Specifically, in a preferred embodiment of the invention, a touch-control area adjustment command is generated by a user operating the lock/unlock controls displayed on the touch screen. That is, only when a touch-control area adjustment command is generated by operations to the lock/unlock controls displayed on the touch screen, will the processing unit 502 determine that the touch-control area adjustment command satisfies a predefined condition, and switch the electronic device 500 to a touch screen locked state. In contrast, when a user performs a touch operation in other area or space on the touch screen, the processing unit 502 determines that the touch-control area adjustment command does not satisfy the predefined condition, and does not switch the electronic device 500 to a touch screen locked state. Likewise, in the touch screen locked state, only when a touch screen lock-releasing signal is generated by a user operating the lock/unlock controls displayed on the touch screen, will the processing unit 502 release the touch screen locked state. The touch operation In the touch screen locked state, when a user performs a touch operation in other area or space on the touch screen, the processing unit 502 of the electronic device 500 ignores that touch operation. Thus, a touch screen easy-locking according to the needs of users is achieved.

Further, in another preferred embodiment of the present invention, the electronic device 500 further comprises a lock/unlock button. That is, only when a touch-control area adjustment command is generated by operations to the lock/unlock button, will the processing unit 502 determine that the touch-control area adjustment command satisfies a predefined condition, and switch the electronic device 500 to a touch screen locked state. Likewise, in the touch screen locked state, only when a touch screen lock-releasing signal is generated by a user operating the lock/unlock button, will the processing unit 502 of the electronic device 500 release the touch screen locked state. In the touch screen locked state, when a user performs a touch operation to the touch screen, the processing unit 502 of the electronic device 500 ignores that touch operation. Thus, a touch screen easy-locking according to the needs of users is achieved likewise.

Further, in yet another preferred embodiment of the present invention, the electronic device 500 further comprises a time counter. When the time counter has passed a predefined period of time, the processing unit 502 does not receive a touch-control area adjustment command generated by a user performing a touch operation to the touch screen, the processing unit 502 switches the electronic device 500 to a touch screen locked state. Thus, an automatic switching of the electronic device 500 to the touch screen locked state is achieved.

Next, with reference to FIG. 6, a method for locking a touch screen of an electronic device 500 according to an embodiment of the present invention will be described.

Figure 6:
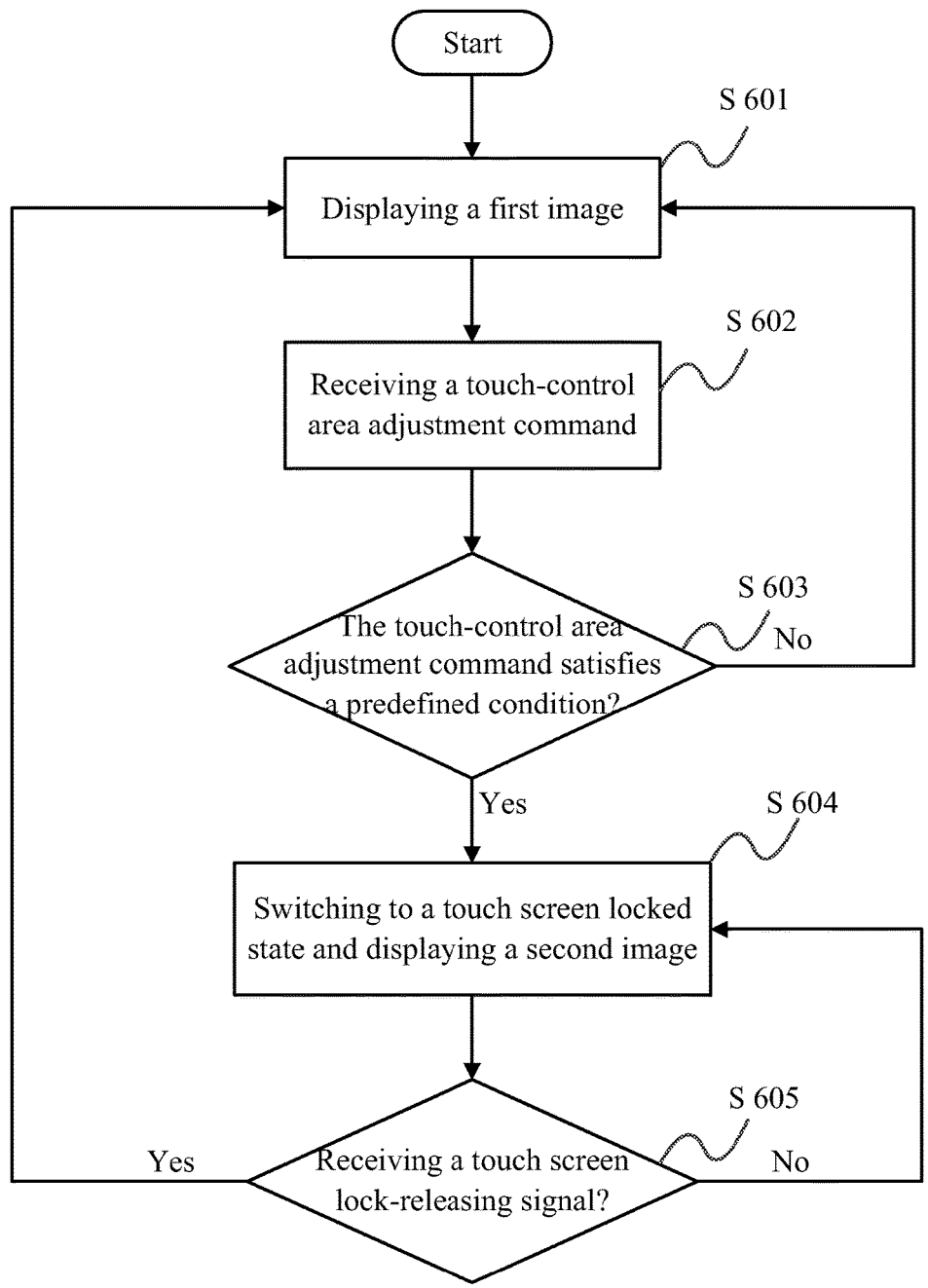
FIG. 6 is a flowchart illustrating a method for locking a touch screen according to another embodiment of the present invention.

FIG. 6 is a flowchart illustrating a method for locking a touch screen according to an embodiment of the present invention.

The method for locking a touch screen according to this embodiment of the invention comprises:

In step S601, the touch-control display unit 501 of the electronic device 500 displays a first image.

For example, in a preferred embodiment of the present invention, the touch-control display unit 501 of the electronic device 500 displays the first image in a full-screen mode. The first image, includes but not limited to, a full-screen displayed image of videos, pictures and texts.

In step S602, the processing unit 502 of the electronic device 500 receives a touch-control area adjustment command.

Specifically, in a preferred embodiment of the present invention, a user of the electronic device 500 input a touch-control area adjustment command by operating the touch screen. Alternatively, in another preferred embodiment of the present invention, a user of the electronic device 500 also may input touch-control area adjustment command by operating various buttons provided on the electronic device 500.

In step S603, the processing unit 502 determines whether or not the received touch-control area adjustment command satisfies a predefined condition.

Specifically, in a preferred embodiment of the present invention, a touch-control area adjustment command is generated by a user operating the lock/unlock controls displayed on the touch screen. That is, only when a touch-control area adjustment command is generated by operations to the lock/unlock controls displayed on the touch screen, will the processing unit 502 determine that the touch-control area adjustment command satisfies a predefined condition. In contrast, when a user performs a touch operation in other area or space on the touch screen, the processing unit 502 determines that the touch-control area adjustment command does not satisfy the predefined condition Alternatively, in another preferred embodiment of the present invention, the electronic device 500 further comprises a lock/unlock button. That is, only when a touch-control area adjustment command is generated by a user's operations to the lock/unlock button, will the processing unit 502 determine that the touch-control area adjustment command satisfies a predefined condition If a negative result is obtained in step S603 (i.e., the processing unit 502 determines that the received touch-control area adjustment command does not satisfy a predefined condition), that is, a user performs a touch operation in other area or space on the touch screen, then the processing procedure returns to step S601 to repeat the processing of step S601 to step S603.

If a positive result is obtained in step S603, i.e., the processing unit 502 determines that the received touch-control area adjustment command satisfies a predefined condition, then the processing procedure proceeds to step S604.

In step S604, the processing unit 502 switches the electronic device 500 to a touch screen locked state. And the touch screen displays a second image, the first image having at least a same part as the second image. Specifically, in a preferred embodiment of the present invention, at the time that the electronic device 500 is switched to a touch screen locked state, the first image is added with a lock/unlock control to become a second image. Furthermore, if no operation is performed to the lock/unlock control displayed on the second image after a predefined period of time, then the lock/unlock control is automatically removed from the second image.

It should be noted that, when switching to the second image, the same part of the first image and the second image continues to display the content being played. For example, if a video content is currently played, then the same part continues to play the video content.

The process further proceeds to step S605. In step S605, the processing unit 502 determines whether or not to receive the touch screen lock-releasing signal.

Specifically, in a preferred embodiment of the present invention, in the touch screen locked state, a touch screen lock-releasing signal is generated only when an operation is performed to the lock/unlock controls displayed on the touch screen. However, when a user performs a touch operation in other area or space on the touch screen, the processing unit 502 of the electronic device 500 ignores that touch operation.

Alternatively, in another preferred embodiment of the present invention, in the touch screen locked state, a touch screen lock-releasing signal is generated only when an operation is performed by a user to the lock/unlock button.

Alternatively, in a further preferred embodiment of the present invention, in the touch screen locked state, a touch screen lock-releasing signal is generated only when a predefined gesture (including, but not limited to, a top-to-bottom or left-to-right sliding started from an edge) is performed by a user to the touch screen.

If a positive result is obtained in step S605, then the processing unit 502 releases the touch screen locked state, and the processing procedure returns to step S601. Contrarily, if a negative result is obtained in step S605, then the electronic device 500 continues to maintain the touch screen locked state, and the processing procedure returns to step S604.

By a processing procedure as described above, a touch screen easy-locking according to the needs of users is achieved.

Figure 5:
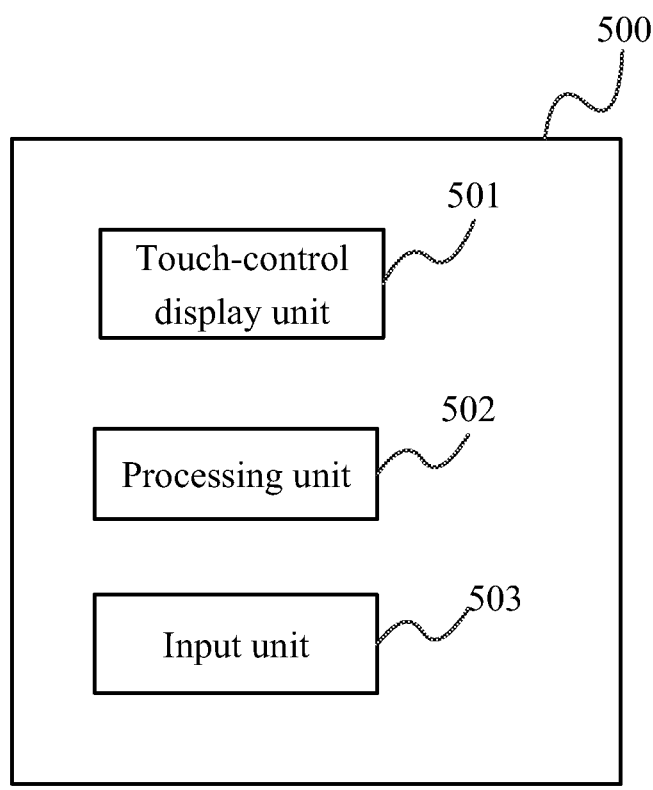
FIG. 5 is a block diagram illustrating a main configuration of an electronic device according to another embodiment of the present invention.

The above has described, with reference to FIG. 5 and FIG. 6, a terminal device and a method for locking a touch screen used in terminal device according to an embodiment of the present invention. Below, with reference to FIG. 7 and FIG. 8, adding a lock/unlock control and a processing procedure for locking a touch screen with the application of the lock/unlock control by a processing unit 502 in the case of a full-screen display mode, will be described in further detail.

Figure 7:
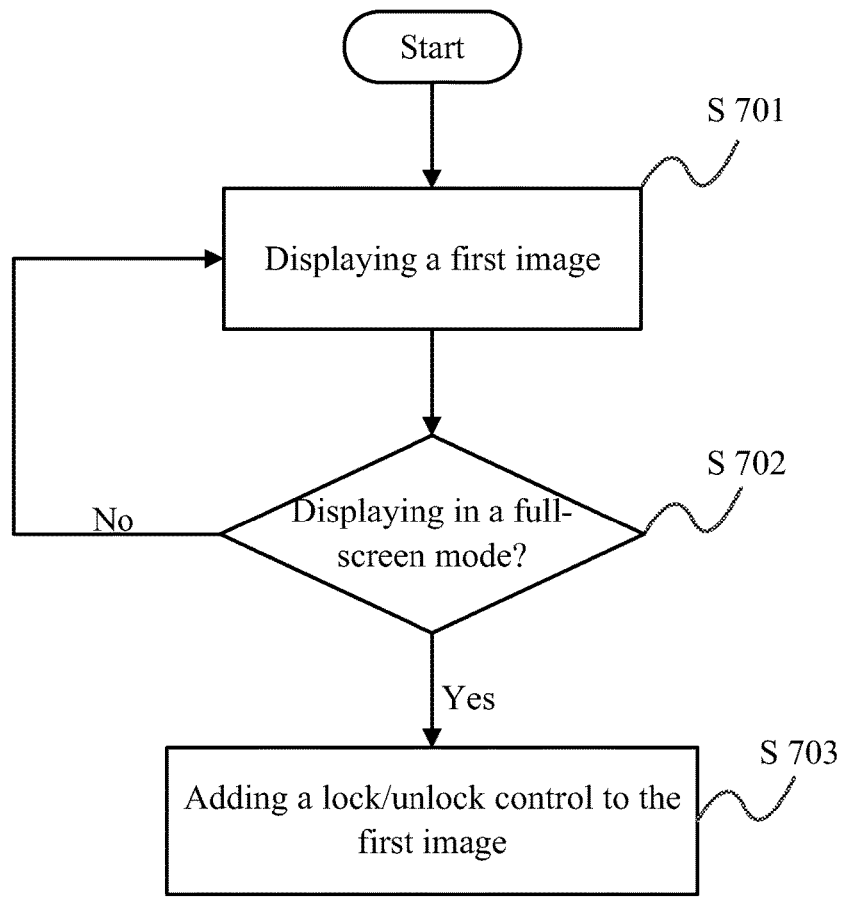
FIG. 7 is a flowchart illustrating an adding process of a lock/unlock control in a full-screen display state according to another embodiment of the present invention.

FIG. 7 is a flowchart illustrating an adding process of a lock/unlock control in a full-screen display state according to an embodiment of the present invention.

In step S701, the touch-control display unit 501 of the electronic device 500 displays a first image.

The process proceeds to step S702. In step S702, the processing unit 502 of the electronic device 500 determines whether or not the first image is displayed in a full-screen mode.

If a positive result is obtained in step S702, i.e. the processing unit 502 determines that the first image is displayed in a full-screen mode, then the processing procedure proceeds to step S703. In step S703, the processing unit 502 adds a lock/unlock control to the first image.

If a negative result is obtained in step S702, i.e. the first image is not displayed in a full-screen mode, then the processing procedure returns to step S701 to continue displaying the first image.

Through a processing procedure shown as FIG. 7, it is achieved adding a lock/unlock controls to a display image in the case of a full-screen display mode. Below, with reference to FIG. 8, a method for locking a touch screen achieved by using the added lock/unlock control will be described in further detail.

Figure 8:
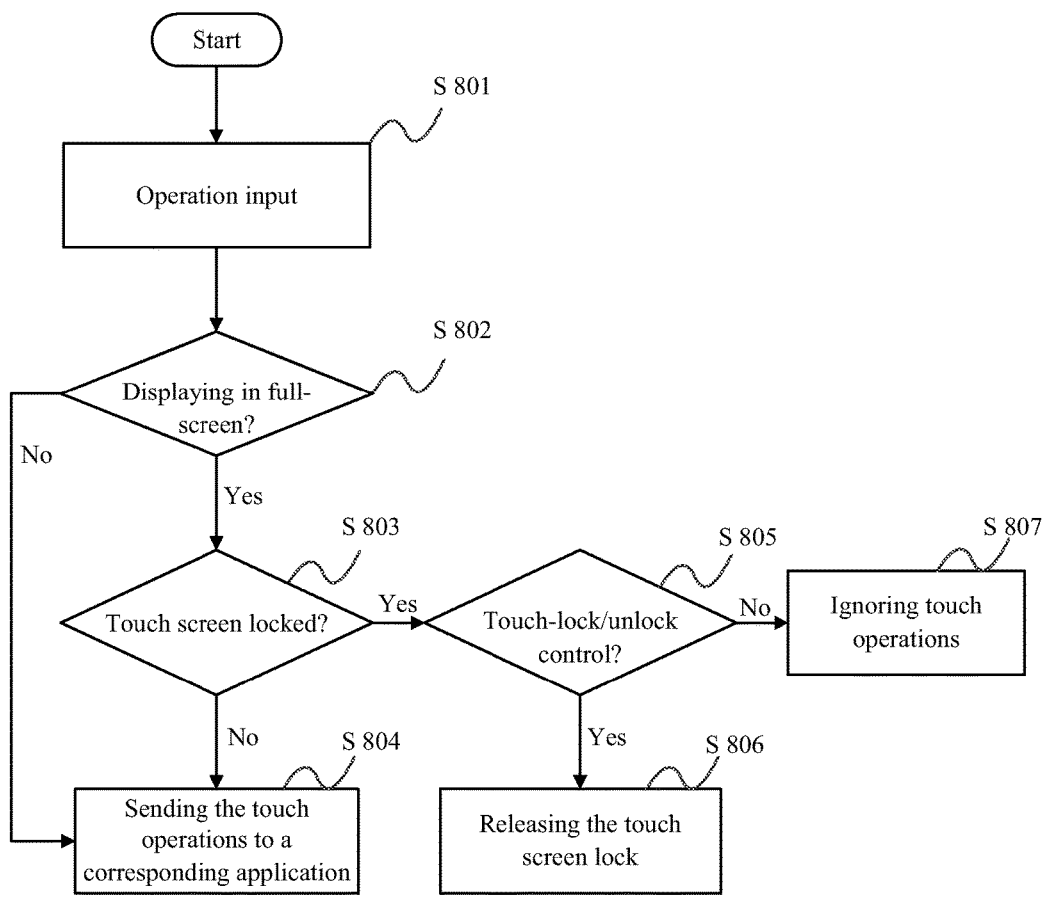
FIG. 8 is a flowchart illustrating a method for locking a touch screen in a full-screen display state according to another embodiment of the present invention.

FIG. 8 is a flowchart illustrating a method for locking a touch screen in a full-screen display state according to an embodiment of the present invention.

In step S801, the electronic device 500 receives a user's operation input to it.

The processing procedure proceeds to step S802. In step S802, the processing unit 502 of the electronic device 500 determines whether or not to execute a display in a full-screen mode.

If a negative result is obtained in step S802, i.e. the processing unit 502 determines not to display in full-screen, then the processing procedure proceeds to step S804. In step S804, the processing unit 502 sends the operation input to its corresponding application, and executes corresponding processes.

Contrarily, if a positive result is obtained in step S802, i.e. the processing unit 502 determines to display in a full-screen mode, then the processing procedure proceeds to step S803. In step S803, the processing unit 502 determines whether or not the electronic device 500 is already in a touch screen locked state.

If a negative result is obtained in step S803, i.e. the processing unit 502 determines that the electronic device 500 is not in a touch screen locked state, then the processing procedure proceeds to step S804. In step S804, the processing unit 502 sends the operation input to its corresponding application, and executes corresponding processes.

Contrarily, if a positive result is obtained in step S803, i.e. the processing unit 502 determines that the electronic device 500 is already in a touch screen locked state, then the processing procedure proceeds to step S805. In step S805, the processing unit 502 determines whether or not a user performs a touch operation to the touch-lock/unlock control.

If a positive result is obtained in step S805, i.e., the processing unit 502 determines that a user performs a touch operation to the touch-lock/unlock control, then the processing procedure proceeds to step S806. In step S806, the processing unit 502 releases the touch screen lock of the electronic device 500.

Contrarily, if a negative result is obtained in step S805, i.e. the processing unit 502 determines that a user does not perform a touch operation to the touch-lock/unlock control, then the processing procedure proceeds to step S807. In step S807, the processing unit 502 ignores that touch operation.

Through a processing procedure shown in FIG. 8, it is achieved a touch screen lock in a full-screen display state by the processing unit 502 using the lock/unlock control added in the case of a full-screen display mode with reference to FIG. 7.

The above has described, with reference to FIGS. 5 to 8, the electronic device and the method for locking a touch screen thereof according to another embodiment of the present invention.

Next, with reference to FIG. 9 and FIG. 10, an electronic device and a method for controlling a screen-lock thereof according to another embodiment of the present invention will be described.

Figure 9:
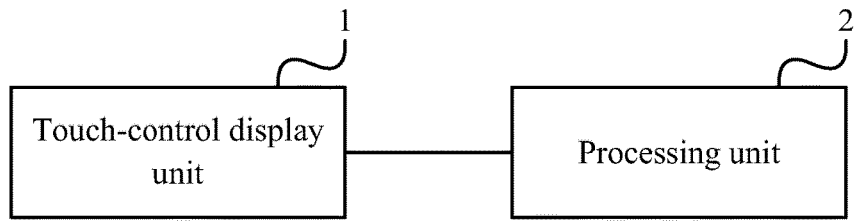
FIG. 9 is a block diagram illustrating a main configuration of an electronic device according to another embodiment of the present invention.

As shown in FIG. 9, the electronic device 900 according to an embodiment of the present invention may comprise a touch-control display unit 901 and a processing unit 902, wherein, the touch-control display unit 901 and the processing unit 902 are connected to each other. The electronic device according to an embodiment of the present invention may be a terminal device having a touch screen, such as a smart phone, a personal digital assistant, a tablet PC, etc.

The touch-control display unit 901 may display image to a user, and may obtain data related to the user's touch on the display region of the touch-control display unit 901. Here, the touch-control display unit 901 may be implemented by any touch screen (for example, a resistive touch screen or a capacitive touch screen).

The processing unit 902 may be implemented by any processor, microprocessor or DSP. According to this embodiment of the present invention, the processing unit 902 may control executing a predefined operation based on a software (for example, an operating system or an application program). Here, by the touch-control display unit 901 receiving a touch-control area adjustment command, and when the touch-control area adjustment command satisfies a predefined condition, switching the touch-control display unit to a touch-control area locked state, the processing unit 902 may set at least an active region and a locked region on the display region of the touch-control display unit 901 when the touch-control display unit 901 of the electronic device enters a screen locked state, the active region corresponding to the second touch-control area, the lock region corresponding to an area except the second touch-control area. In this case, the processing unit 902 displays at least part of a running window of a preset application or an icon of a preset application, on the active region of the display region, through the touch-control display unit 901. At this time, the processing unit 902 is configured to—in the screen locked state of the touch-control display unit 901—make responses only to the touch operations in the active region and unlocking operations to the electronic device.

Specifically, the preset application may be the part of applications that are allowed to be used (such as some functions of the operating system, applications, widgets, and so on) when the touch-control display unit 901 is in the screen locked state. Here, the preset application may best be the applications (such as weather, news, or widgets, etc.) that are often used by a user and have not a high level of security requirement. In this case, even if a user's electronic device in a screen locked state is used by others, only those applications that are often used by a user and have not a high level of security requirement would be used by others, whereas the applications (such as contacts) that have a higher level of security requirement would not be used by others. Here, the preset applications which can be used in a screen locked state of the touch-control display unit 901, may be set in an operating system (such as, android) at the electronic device's delivery or in a screen locking program, or, a user of the electronic device may select the preset applications which can be used in a screen locked state of the touch-control display unit 901 in the operating system or in the screen locking program.

According to this embodiment of the present invention, in a screen locked state of the touch-control display unit 901, the active region may be located in the upper half of the display region of the touch-control display unit 901, whereas the locked region may be located in the lower half of the display region of the touch-control display unit 901. In addition, the present invention is not limited thereto, and the active region may be located in the lower half of the display region of the touch-control display unit 901, or the active region may occupy any area of the upper, middle or lower portion of the display region of the touch-control display unit 901 as needed. Here, the scope of the active region may be set in an operating system or a screen locking program of the electronic device.

In this case, according to an embodiment of the present invention, if the electronic device is not used in a predefined period of time (for example, 1 minute), then the processing unit 902—based on an operating system or a screen locking program—control the touch-control display unit 901 to enter into a screen locked status. At this time, the processing unit 902 may—based on a configuration of the screen locking program or the operating system—set a predefined region in the display region of the touch-control display unit 901 as an active region, and a region outside of the active region in the display region as the locked region. In this case, the processing unit 902 controls the touch-control display unit 901 to display a preset application's running window or a part of the running window (for example, thumbnail contents) or its icon in the set active region, to show a user the contents of the part of the preset application that he/she can use. Here, it is possible to display thumbnail windows or icons of all preset applications that can be used in the active region when the touch-control display screen 1 enters into a screen locked state. Alternatively, it is possible to display the running windows or the icons of the applications running before the touch-control display screen 1 enters into a screen locked state in the active region, when the touch-control display screen 1 enters into a screen locked state. In addition, it is possible to determine the sizes and spacing of the windows or icons of the preset applications to be displayed, based on the number of the preset applications to be displayed in the active region.

In addition, the present invention is not limited thereto, and, if the electronic device is not used in a predefined period of time (for example, 1 minute), then the processing unit 902—based on an operating system or a screen locking program—control the touch-control display unit 901 to enter into a screen locked status. At this time, the processing unit 902 may determine the scope of the active region, based on a configuration of a screen locking program or an operating system and based the positions and sizes of the windows or icons of the preset applications applied on the touch-control display unit 1 before the touch-control display screen 1 is screen-locked. Here, the scope of the active region may be coincident with or slightly larger than the scope of the windows or icons of the preset applications applied on the touch-control display unit 1 before the touch-control display screen 1 is screen-locked.

Then, in the case that the touch-control display unit 901 enters into a screen locked state, and the running windows or icons of the preset applications are displayed on the active region, the processing unit 902—in the control of the operating system or a screen locking program—only make responses to touch operations in the active region and unlocking operations to the electronic device. Here, since the present invention does not involve changes to the unlocking operations to the electronic device, therefore which will not be described in detail here.

Here, since the touch-control display unit 901 is any type of touch screen, which thus comprises a (for example, resistive or capacitive) touch sensor unit, the touch sensor unit may be coincident with the display region and can obtain a position of a user's touch on the display region.

In the case that the touch-control display unit 901 enters into a screen locked state, and the running windows or icons of the preset applications are displayed on the active region, the processing unit 902—through the user's touch position on the display region, which is provided by the touch sensor unit of the touch-control display unit 901—determine whether or not the user's touch position on the display region is within the active region of the display region. Here, the processing unit 902 may compare the user's touch position (for example, coordinate data) with the scope of the active region. If the touch position is within the scope of the active region, then the processing unit 902 executes a further processing.

In this case, if the user's touch position on the display region is within the active region, then the processing unit 902 based on the touch position—determines whether or not the user's touch corresponds to one of the preset applications displayed within the active region. Specifically, because—when the touch-control display unit 901 enters into a screen locked state—the processing unit 902 set an active region and windows or icons of the preset applications within the active region, thus the processing unit 902 can easily obtain the positions and scopes of the windows or icons of the preset applications within the active region. In this case, the processing unit 902 will—based on the touch position as well as the positions and scopes of the preset applications within the active region—determine the user's touch position corresponds to which preset application within the active region.

In this case, if the processing unit 902 determines that the user's touch corresponds to one of the preset applications, then the processing unit 902 makes that one of the preset applications generate a response to the user's touch. Here, responses of a preset application to a user's touch are different based on different specific applications. For example, responses of a preset application may include refreshing the contents of the preset application, opening a window of the preset application, activating the preset application, dragging the preset application, etc.

In addition, if the processing unit 902 determines that the user's touch position is within the locked region, then the processing unit 902 intercepts a user's touch, that is, the electronic device according to this embodiment of the invention does not make any response to the user's touch in the locked region.

With the above configuration, when the touch-control display unit 901 of the electronic device into a screen locked state, the processing unit 902 may set an active region and a locked region in the display region of the touch-control display unit 901. At this time, an icon or at least part of a running window of a preset application is displayed on the active region of the display region, and only the touch operations within the active region are responded. In this case, it is possible to set some applications (such as weather, newsfeeds, etc.) that are often used and have not a high level of security requirement, so that users may still use these applications during the locking of the touch screen, thereby operations becomes more convenient. In addition, since users can only use those applications which have not a high level of security requirement during the locking of the touch screen. In this case, even if the electronic device is lent to others to use these applications, the others can not use other applications (for example, contacts, notepad, etc.) except these applications due to the locked screen, thereby effectively protecting the data contents in the electronic device.

Below, with reference to FIG. 10, a method for controlling a screen-lock of the electronic device according to an embodiment of the present invention will be described. FIG. 10 is a flowchart illustrating a method for controlling a screen-lock of an electronic device according to an embodiment of the present invention. Here, the electronic device according to an embodiment of the present invention comprises a touch-control display unit, which may display image to a user and may obtain data related to the user's touch on the display region of the touch-control display unit.

Figure 10:
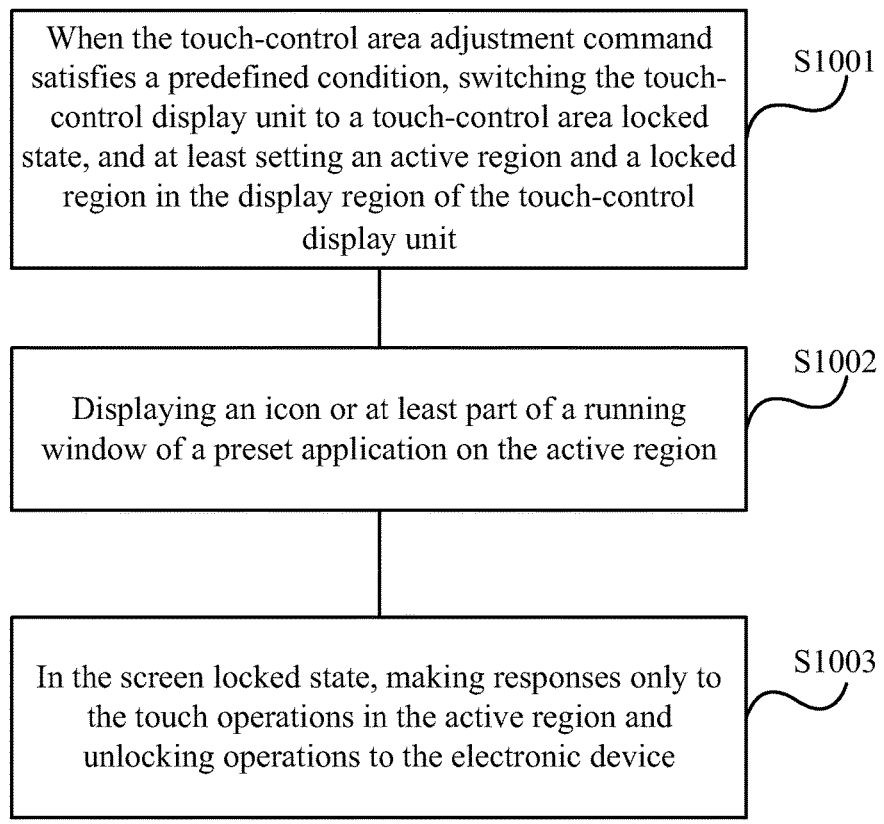
FIG. 10 is a flowchart illustrating a method for controlling a screen-lock of an electronic device according to another embodiment of the present invention.

As shown in FIG. 10, in step S1001, by the touch-control display unit receiving a touch-control area adjustment command, and when the touch-control area adjustment command satisfies a predefined condition, switching the touch-control display unit to a touch-control area locked state, at least an active region and a locked region are set in the display region of the touch-control display unit, the active region corresponding to the second touch-control area, the locked region corresponding to an area except the second touch-control area.

Specifically, if the electronic device is not used in a predefined period of time (for example, 1 minute), then the processing unit 902—based on an operating system or a screen locking program—control the touch-control display unit 901 to enter into a screen locked status. At this time, the processing unit 902 may—based on a configuration of the screen locking program or the operating system—set a predefined region in the display region of the touch-control display unit 901 as an active region, and a region outside of the active region in the display region as the locked region.

For example, in a screen locked state of the touch-control display unit 901, the active region may be located in the upper half of the display region of the touch-control display unit 901, whereas the locked region may be located in the lower half of the display region of the touch-control display unit 901. In addition, the present invention is not limited thereto, and the active region may be located in the lower half of the display region of the touch-control display unit 901, or the active region may occupy any area of the upper, middle or lower portion of the display region of the touch-control display unit 901 as needed. Here, the scope of the active region may be set in an operating system of a screen locking program of the electronic device.

Further, the present invention is not limited thereto, and the processing unit 902 may also determine the scope of the active region, based on a configuration of a screen locking program or an operating system and based the positions and sizes of the windows or icons of the preset applications applied on the touch-control display unit 1 before the touch-control display screen 1 is screen-locked. Here, the scope of the active region may be coincident with or slightly larger than the scope of the windows or icons of the preset applications applied on the touch-control display unit 1 before the touch-control display screen 1 is screen-locked.

In step S1002, an icon or at least part of a running window of a preset application is displayed on the active region.

In this case, the processing unit 902 controls the touch-control display unit 901 to display a preset application's running window or a part of the running window (for example, thumbnail contents) or its icon in the set active region, to show a user the contents of the part of the preset application that he/she can use. The preset application may be the part of applications that are allowed to be used (such as some functions of the operating system, applications, widgets, and so on) when the touch-control display unit 901 is in the screen locked state. Here, the preset application may best be the applications (such as weather, news, or widgets, etc.) that are often used by a user and have not a high level of security requirement.

Here, it is possible to display thumbnail windows or icons of all preset applications that can be used in the active region when the touch-control display screen 1 enters into a screen locked state. Alternatively, it is possible to display the running windows or the icons of the applications running before the touch-control display screen 1 enters into a screen locked state in the active region, when the touch-control display screen 1 enters into a screen locked state. In addition, it is possible to determine the sizes and spacing of the windows or icons of the preset applications to be displayed, based on the number of the preset applications to be displayed in the active region.

Further, the present invention is not limited thereto, and the processing unit 902 may also determine the scope of the active region, based on a configuration of a screen locking program or an operating system and based the positions and sizes of the windows or icons of the preset applications applied on the touch-control display unit 1 before the touch-control display screen 1 is screen-locked. Here, the scope of the active region may be coincident with or slightly larger than the scope of the windows or icons of the preset applications applied on the touch-control display unit 1 before the touch-control display screen 1 is screen-locked.

In step S1003, in the screen locked state, responses are only made to the touch operations in the active region and unlocking operations to the electronic device.

Specifically, in the case that the touch-control display unit 901 enters into a screen locked state, and the running windows or icons of the preset applications are displayed on the active region, the processing unit 902—through the user's touch position on the display region, which is provided by the touch sensor unit disposed on the touch-control display unit 901—determine whether or not the user's touch position on the display region is within the active region of the display region. Here, the processing unit 902 may compare the user's touch position (for example, coordinate data) with the scope of the active region. If the touch position is within the scope of the active region, then the processing unit 902 executes a further processing.

In this case, if the user's touch position on the display region is within the active region, then the processing unit 902 based on the touch position—determines whether or not the user's touch corresponds to one of the preset applications displayed within the active region. Specifically, because—when the touch-control display unit 901 enters into a screen locked state—the processing unit 902 set an active region and windows or icons of the preset applications within the active region, thus the processing unit 902 can easily obtain the positions and scopes of the windows or icons of the preset applications within the active region. In this case, the processing unit 902 will—based on the touch position as well as the positions and scopes of the preset applications within the active region—determine the user's touch position corresponds to which preset application within the active region.

In this case, if the processing unit 902 determines that the user's touch corresponds to one of the preset applications, then the processing unit 902 makes that one of the preset applications generate a response to the user's touch. Here, responses of a preset application to a user's touch may be different based on different specific applications. For example, responses of a preset application may include refreshing the contents of the preset application, opening a window of the preset application, activating the preset application, dragging the preset application, etc.

In addition, if the processing unit 902 determines that the user's touch position is within the locked region, then the processing unit 902 intercepts a user's touch, that is, the electronic device according to this embodiment of the invention does not make any response to the user's touch in the locked region.

The above has described, with reference to FIG. 9 and FIG. 10, an electronic device and a method for controlling a screen-lock thereof according to another embodiment of the present invention.

It should be noted that, in this specification, the term "comprising", "including" or any other variant is intended to cover a non-exclusive inclusion, so that a process, method, article or device comprising a series of elements, comprises not only those elements but also comprises other elements not expressly listed, or comprises elements inherent in this process, method, article, or device. In the case of no more restrictions, an element defined by the statement "comprises a", does not preclude the existence of additional identical elements in a process, method, article or device comprising that element.

In addition, it should be noted that, the above expressions such as "first", "second" and the like are only used, for convenience in describing, to distinguish a unit with another unit, which does not mean that the two units must be set as physically separated. That is, for example, a first display processing unit and a second display processing unit may be provided as two separated units, may also be provided as a single unit.

Finally, it should be noted that, the series of processes described above comprise not only processes executed in time series in the order described herein, but also comprises parallel or separated processes executed not in time series.

Through the above description of the embodiments, the skilled in the art can clearly understand that the present invention may be achieved through software plus a necessary hardware platform; of course, it may also be implemented entirely by hardware. Based on such understanding, all or a portion of the contribution of the technical solution of the present invention to the background technology, may be embodied in the form of a software product, the computer software product may be stored in a storage medium, such as a ROM/RAM, disk, CD, etc., comprising a plurality of instructions that allows a computer device (may be a personal computer, server, or network device, etc.) to execute methods described in various embodiments or some portion of the embodiments of the present invention.

In embodiments of the present invention, a unit/module may be implemented by software so as to be executed by various types of processors. For example, one identifier's executable code module may comprise one or more physical or logical blocks of computer instructions, for example, which can be constructed as an object, procedure, or function. Nevertheless, executable codes of an identified module need not physically located together, but may comprise different instructions stored in different positions, when these instructions are logically combined together, they constituent units/modules and achieve the specified purposes of the units/modules.

When units/modules can be implemented by using a software, taking into account the level of the existing hardware processing technology, the units/modules may be implemented in software; in the case of not considering the costs, the skilled in the art all can build a corresponding hardware circuit to achieve a corresponding function, wherein, the hardware circuit comprises a conventional ultra-large scale integrated (VLSI) circuit or a gate array, such as logic chips, existing semiconductors such as transistors and the like, or other discrete components. Modules may further achieved by programmable hardware device, such as a field programmable gate array, programmable logic array, programmable logic devices, etc.

The above has described the present invention in detail, and specific examples are applied to explain the principles and embodiments of the present invention in this specification; however, the above description of the embodiments is only used to help understanding the methods and the core idea of the present invention; meanwhile, for the ordinary skilled in the art, based on the idea of the invention, variations will be made both in specific implementations and application scopes. In summary, the content of this specification should not be understood as a limit to the present invention.

What is claimed is:

1. A method for adjusting a touch-control area of a touch-control display unit, applied to an electronic device, the electronic device comprising the touch-control display unit, the touch-control area of the touch-control display unit being a first touch-control area, the method comprising:
    displaying a display image on a display region of a display unit in the touch-control display unit, the display region is the same as the first touch-control area;
    identifying input control which can be operated by a user and content which cannot be operated by a user included in the display image, the input control being displayed at a first position on the first display region, and the contents being displayed at a second position on the display region;
    receiving a touch-control area adjustment command, wherein the touch-control area adjustment command is a step-type adjustment command that specifies a preset size of the adjusted touch-control area;
    in response to the touch-control area adjustment command, changing the first touch-control area of the electronic device into a second touch-control area, which is smaller than the first touch-control area and has the preset size specified in the touch-control area adjustment command; and
    displaying the input control at a third position within the second touch-control area, and maintaining the content at the second position of the display region, wherein all dimensions of the display region remain unchanged.

2. The method for adjusting a touch-control area according to claim 1, wherein the method for adjusting a touch-control area further comprises:
    in response to the touch-control area adjustment command, displaying the display image on a second display region in the display region of the display unit.

3. The method for adjusting a touch-control area according to claim 2, wherein, the display region corresponds to a first portion in the display unit, and the displaying the display image on the second display region comprises:
    in response to the touch-control area adjustment command, determining a second portion in the display unit;
    utilizing the second portion in the display unit to display the display image of the electronic device; and
    shutting off other portions of the display unit except the second portion in the display unit.

4. The method for adjusting a touch-control area according to claim 2 wherein, the display region corresponds to a first portion in the display unit, and the displaying the display image on the second display region comprises:
    in response to the touch-control area adjustment command, determining a second portion in the display unit; and
    controlling the second portion in the display unit to display an image unrelated to the display image.

5. The method for adjusting a touch-control area according to claim 1, further comprising:
    when the touch-control area adjustment command satisfies a predefined condition, switching the touch-control display unit to a touch-control area locked state, and changing a first image displayed on the display region of the touch-control display unit to a second image, the first image having at least a same part as the second image, wherein,
    in the touch-control area locked state, the electronic device, in response to a touch-control area lock-releasing signal, releases the touch-control area locked state, and
    in the touch-control area locked state, except for operations used to generate a touch-control area lock-releasing signal, the electronic device ignores touch operations performed on the touch-control area.

6. The method for adjusting a touch-control area according to claim 5, further comprising:
    in the case that a control signal is not received through a predefined period of time, switching the electronic device to a touch screen locked state.

7. The method for adjusting a touch-control area according to claim 5, wherein, the same part continues to display the content being played.

8. The method according to claim 1, wherein,
    when the touch-control display unit enters a screen-locked state, the scope of an active region is determined based on the position and size of the window or icon of preset application on the touch-control display unit.

9. The method according to claim 1, wherein,
    the touch-control display unit comprises a touch-sensor unit, configured for obtaining a touch position of a user on the display region of the touch-control display unit.

10. The method according to claim 9, wherein,
    when the touch-control display unit is in a screen-locked state, the touch position on the display region is determined whether or not within an active region;
    if the touch position is within the active region, then based on the touch position, the user's touch is determined whether or not corresponding to a preset application; and
    if the user's touch corresponds to the preset application, then the preset application is allowed to respond to the user's touch.

11. The method according to claim 10, wherein, if the touch position is within a locked region, then the user's touch is intercepted.

12. The method for adjusting a touch-control area according to claim 1, wherein, the touch-control display unit comprises a touch sensor, the first touch-control area corresponding to a first portion in the touch sensor, and the adjusting the touch-control area of the electronic device to the second touch-control area comprises:
in response to the touch-control area adjustment command, determining a second portion in the touch sensor based on the size of the second touch-control area specified in the touch-control area adjustment command; and
shutting off other portions of the touch sensor except the second portion in the touch sensor.

13. The method for adjusting a touch-control area according to claim 1, wherein the touch-control display unit comprises a touch sensor, the first touch-control area corresponding to a first portion in the touch sensor, and the changing the touch-control area of the electronic device into a second touch-control area comprises:
in response to the touch-control area adjustment command, determining a second portion in the touch sensor based on the size of the adjusted touch-control area specified in the touch-control area adjustment command; and
shutting off other portions of the touch sensor except the second portion in the touch sensor.

14. The method for adjusting a touch-control area according to claim 13, wherein the changing the first touch-control area of the electronic device into a second touch-control area comprises:
in response to the touch-control area adjustment command, determining a third portion in the touch sensor; and
setting the third portion in the touch sensor to a disabled state, in which disabled state when a touch-control signal from the third portion is received, no response is made to the touch-control signal.

15. An electronic device comprising:
a touch-control display unit, a touch-control area of the touch-control display unit being a first touch-control area, the touch-control display unit comprising a display unit for displaying a display image on a display region of the display unit, the first display region is the same as the first touch control area;
a first display processing unit, identifying input control which can be operated by a user and content which cannot be operated by a user included in the display image, the input control being displayed at a first position on the display region, and the contents being displayed at a second position on the display region;
a receiver unit, receiving a touch-control area adjustment command, wherein the touch-control area adjustment command is a step-type adjustment command that specifies a preset size of the adjusted touch-control area;
an adjusting unit, in response to the touch-control area adjustment command, adjusting the touch-control area of the electronic device to a second touch-control area, which is smaller than the first touch control area and has the preset size specified in the touch-control area adjustment command;
wherein the first display processing unit displays the input control at a third position within the second touch-control area, and maintains the content at the second position of the first position, wherein all dimensions of the display region remain unchanged.

16. The electronic device according to claim 15, wherein, the electronic device further comprises:
a second display processing unit, in response to the touch-control area adjustment command, displaying the display image on a second display region in the display region of the display unit.

17. The electronic device according to claim 16, wherein, the display region corresponds to a first portion in the display unit, and the second display processing unit comprises:
a third determination unit, in response to the touch-control area adjustment command, determining a second portion in the display unit;
a first sub-display processing unit, utilizing the second portion in the display unit to display the display image of the electronic device; and
a second shut-off unit, shutting off other portions of the display unit except the second portion in the display unit.

18. The electronic device according to claim 16, wherein, the display region corresponds to a first portion in the display unit, and the second display processing unit comprises:
a fourth determination unit, in response to the touch-control area adjustment command, determining a third portion in the display unit;
a second sub-display processing unit, controlling the third portion in the display unit to display an image unrelated to the display image.

19. The electronic device according to claim 15, further comprising a processing unit, which is configured for:
when the touch-control area adjustment command satisfies a predefined condition, switching the touch-control display unit to a touch-control area locked state, and changing a first image displayed on the display region of the touch-control display unit to a second image, the first image having at least a same part as the second image, wherein,
in the touch-control area locked state, a control unit causes the electronic device, in response to a touch-control area lock-releasing signal, to release the touch-control area locked state, and
in the touch-control area locked state, except for operations used to generate a touch-control area lock-releasing signal, the electronic device ignores touch operations performed on the touch-control area.

20. The electronic device according to claim 15, wherein, the touch-control display unit comprises a touch sensor, the first touch-control area corresponding to a first portion in the touch sensor, and the adjusting unit comprises:
a first determination unit, in response to the touch-control area adjustment command, determining a second portion in the touch sensor based on the size of the adjusted touch-control area specified in the touch-control area adjustment command; and
a first shut-off unit, shutting off other portions of the touch sensor except the second portion in the touch sensor.

21. The electronic device according to claim 15, wherein the touch-control display unit comprises a touch sensor, the first touch-control area corresponding to a first portion in the touch sensor, and the adjusting unit comprises:
a first determination unit in response to the touch-control area adjustment command, determining a second portion in the touch sensor based on the size of the adjusted touch-control area specified to the touch-control area adjustment command; and
a first shut off unit shutting off other portions of the touch sensor except the second portion in the touch sensor.

22. The electronic device according to claim 21, wherein, the adjusting unit comprises:
a second determination unit, in response to the touch-control area adjustment command, determining a third portion in the touch sensor; and
a setting unit, setting the third portion in the touch sensor to a disabled state, in which disabled state when a touch-control signal from the third portion is received, no response is made to the touch-control signal.

23. An electronic device comprising:
a touch-control display unit, a touch-control area of the touch-control display unit being a first touch-control area, the touch-control display unit comprising a display unit for displaying a display image on a display region of the display unit, the first display region is the same as the first touch control area;
an input interface, configured for receiving a touch-control area adjustment command, wherein the touch-control area adjustment command is a step-type adjustment command that specifies a preset size of the adjusted touch-control area;
a processor, configured for identifying input control which can be operated by a user and content which cannot be operated by a user included in the display image, the input control being displayed at a first position on the display region, and the contents being displayed at a second position on the display region; and in response to the touch-control area adjustment command, adjusting the first touch-control area of the electronic device to a second touch-control area, which is smaller than the first touch control area and has the preset size specified in the touch-control area adjustment command; and
a display, configured for displaying the input control at a third position within the second touch-control area, and maintaining the content at the second position of the first display region, wherein all dimensions of the display region remain unchanged.

* * * * *